A. L. De LEEUW & S. EINSTEIN.
FEED CONTROLLING MECHANISM.
APPLICATION FILED OCT. 23, 1907.
961,405.
Patented June 14, 1910.
2 SHEETS—SHEET 1.
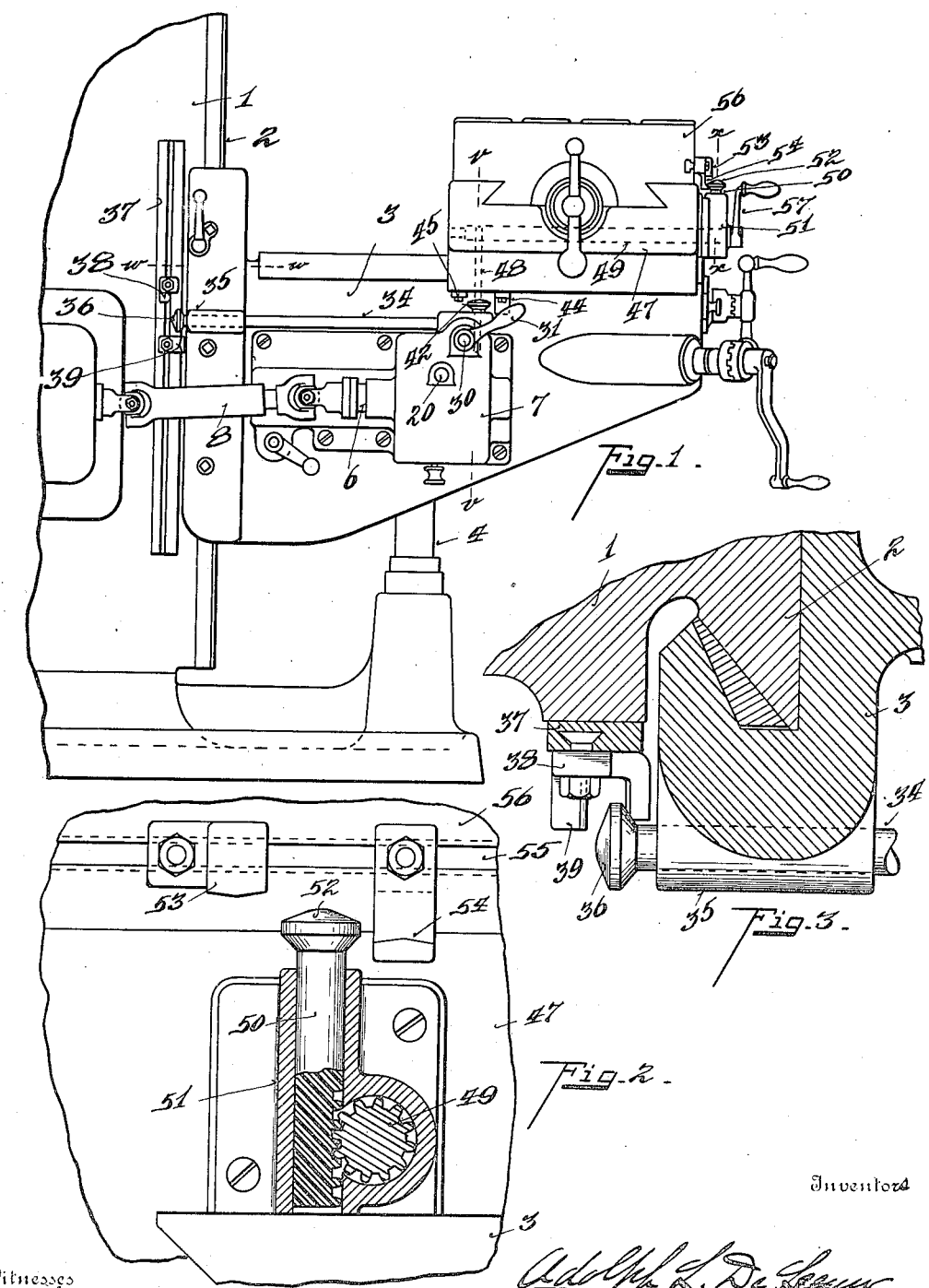

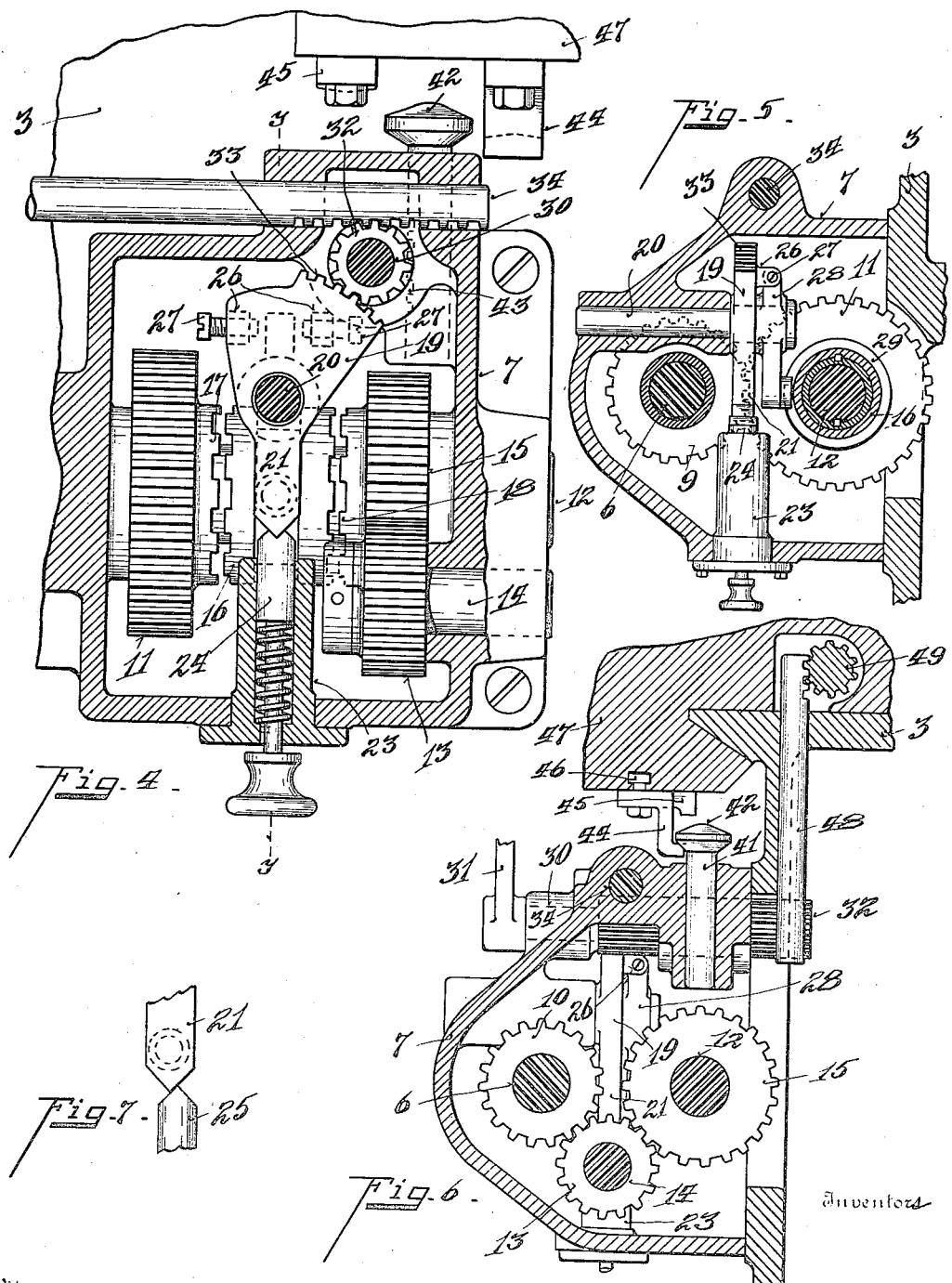
A. L. DE LEEUW & S. EINSTEIN.
FEED CONTROLLING MECHANISM.
APPLICATION FILED OCT. 23, 1907.
961,405.
Patented June 14, 1910.
2 SHEETS—SHEET 2.

UNITED STATES PATENT OFFICE.

ADOLPH L. DE LEEUW, OF HAMILTON, AND SOL EINSTEIN, OF CINCINNATI, OHIO, ASSIGNORS TO THE CINCINNATI MILLING MACHINE COMPANY, OF CINCINNATI, OHIO, A CORPORATION.

FEED-CONTROLLING MECHANISM.

961,405.   Specification of Letters Patent.   Patented June 14, 1910.

Application filed October 23, 1907. Serial No. 398,720.

*To all whom it may concern:*

Be it known that we, ADOLPH L. DE LEEUW and SOL EINSTEIN, citizens of the United States, residing at Hamilton and Cincinnati, in the counties of Butler and Hamilton and State of Ohio, have invented certain new and useful Improvements in Feed-Controlling Mechanism, of which the following is a specification.

Our invention relates to a trip mechanism for the feed elements of a machine tool, exemplified by a milling machine in the drawings.

Our invention has a special reference to an automatic trip system for the vertically reciprocating knee, the horizontally reciprocating saddle and the table reciprocating transversely on the saddle, so organized that each of these reciprocating feed elements may be caused to actuate its particular trip mechanism which has motion transmission connection with a common clutch controller operating a main clutch controlled feed shaft, so that each of these feed elements may automatically stop, or, automatically reverse, through the action of the common clutch controller.

One of the objects of the invention is to have a clutch controlling the transmission of motion from the drive to the various feed devices, such as the knee, table, etc., each particular feeding element having an individual trip with connections for controlling the common clutch.

Other objects of the invention are, that the trip controlled clutch shall be instantaneous, accurate and invariable in action, not subjected to the working strains borne by the particular feed device controlled by a particular trip, and also the provision of a more powerful clutch than would be possible in instances where the clutch is interposed between a particular feeding device and its feeding mechanism. In the instance, say of a milling machine table, in which a trip controlled clutch is interposed between a table and its feeding mechanism, primarily this clutch has to be small and relatively weak owing to conditions of the available space, necessitated by this location. Again, the speed of the table feed screw is relatively very low and hence the operation of the trip is not instantaneous nor at all times accurate and reliable, especially does this become true after the machine is used, as the trip controlled clutch bears all the working strains of the table, and hence uneven wear of the clutch teeth is practically inevitable, and as the slightest lost motion in tripping is reproduced in the table feed, precision is impossible. Therefore we mount the trip controlled clutch on a shaft much faster in rotation than the screw feed shaft, and as a result the trip acts instantaneously accurately and reliably, the clutch may be as powerful as desired, and at the same time remain free from direct working strains.

Another object of the invention is to so construct the several trips, that when a particular trip is operated, say the table feed trip, that the table shall be left with its feed mechanism intact and with provision for manual feeding manipulations.

Another object of the invention is to so construct the tripping mechanism that the setting lever moves in setting, in the direction of travel of the member to be tripped.

Another object of the invention is to construct a simple form of trip consisting of a single plunger element adapted to be automatically operated in either direction of movement of the reciprocating machine part.

In prior devices in which two trip plungers are employed, one for each direction of travel of the reciprocating feed, it frequently occurs that after tripping one of the plungers, the other plunger will stand in the path of movement of one of the dogs and prevent the movement of the feed in the desired direction, this disadvantage is overcome by the use of a single plunger adapted to be tripped by both dogs.

In the description and the drawings for convenience of illustration, the mechanism of a milling machine is disclosed.

Figure 1 is a side elevation of that portion of a milling machine in which our invention is applied. Fig. 2 is a section on line $x$, $x$, Fig. 1. Fig. 3 is a section on line $w$, $w$, Fig. 1. Fig. 4 is a central vertical section through the feed box secured to the knee as shown in Fig. 1. Fig. 5 is a section on line $y$, $y$, Fig. 4. Fig. 6 is a section on line $v$, $v$, Fig. 1. Fig. 7 is a detail view of the mechanism for effecting a reverse feed when the tripping lever actuated by the tripping mechanism is operated.

1 represents the main frame of a milling machine.

2 represents the dove-tail guide-way upon which the knee 3 is movably mounted.

4 represents the vertical feed screw for raising and lowering the knee. This is done in the well known manner by hand and power, likewise the feeding of the carriage and cross feed of the table, which feeding mechanism is not illustrated in the drawings forming no part of this invention, and only so much being shown as will operate upon the main transmitting power feed for the various parts, and thereby control the various distributing feeds tributary from the main source of feed.

6 represents the main shaft suitably journaled within the feed box or casing 7 secured to one side of the knee 3, said shaft being provided with the usual universal joints and extension shaft 8 receiving power from the main source of drive of the machine not shown, which universal joint connection is of well known use in milling machines, but any well known means for transmitting motion to shaft 6 may be employed. Within the casing 7 is mounted the transmission gearing for transmitting forward or reverse feed to the knee carriage or table.

9, 10, represent gears fixed upon the shaft 6. Gear 9 being in mesh with gear 11, loose upon shaft 12, journaled in the frame 7.

13 represents an intermediate gear in mesh with gear 10 journaled upon a stud shaft 14 supported within the casing 7 and likewise in mesh with a gear 15 loosely supported upon the shaft 12. Clutching mechanism being employed for clutching gears 11 and 15 alternately to the shaft 12 for driving shaft 12 in a forward or reverse rotation. Gears 9 and 11 produce the forward motion when properly thrown into operation and gears 10, 13 and 15 effecting the reverse feed to shaft 12. From this shaft 12 suitable transmission gearing or elements are connected for the various feeds heretofore mentioned.

16 represents a clutch sleeve splined and keyed to the shaft 12 provided with clutch teeth upon each side thereof adapted to be alternately thrown in clutching engagement with the clutch teeth 17, 18, formed on the gears 11 and 15 respectively, and forms the main shifting element which is automatically or manually controlled by the tripping mechanism hereinafter to be described, for starting, stopping and reversing the motion of the feed. With the trip lever arrangement as shown in Fig. 4 of the drawings the operation of the tripping mechanism will throw the feed from a driving condition either forward, reverse or to rest, and when it is desired to control the feed from its forward rotation to a reverse or vice versa the plunger shown in Fig. 7 is inserted in place of the plunger shown in Fig. 4.

19 represents the tripping lever operated by the various tripping mechanisms, it is pivoted upon the stud pin 20 and provided with a downwardly projecting arm 21 terminating in a V-shaped point.

23 represents an upwardly projecting sleeve fixed to the frame 7 within which sleeve the spring actuated plunger 24 is slidably mounted, said plunger being provided with the beveled and V-shaped notched end. In Fig. 4, the plunger coöperating with the lever 21 is the form used for bringing the feeds to a state of rest, and in Fig. 7 the form for effecting the complete reversal of the clutch is shown.

26 represents ears projecting from the shifting lever 19, see Figs. 4, 5 and 6, carrying adjusting screws 27 against which the clutch actuating lever 28 contacts. Said lever 28 being loosely pivoted upon the stud pin 20. Said lever 28 is provided with a boss or roller projection adapted to fit or ride within the peripheral groove 29 formed in the clutch sleeve 16. Thus as the shifting lever 19 is moved either to the right or left it will bring one of the adjusting screws 27 into contact with the actuating lever 28 carrying the same with it in its movement, and thereby shifting the clutch sleeve 16. By this arrangement a predetermined idle movement can be imparted to the shifting lever 19, taking place while the beveled portion of the arm 21 of the shifting lever 19 moves along or upon the beveled portion of the plunger 24, and as soon as the apex of said arm 21 passes slightly beyond either one of the points of the plunger 24, the shifting lever 19 will be quickly thrown to its completed stroke, caused by the upward pressure of the plunger 24 or plunger 25, whichever is employed.

With our improvement we control the various shiftings of the lever 19 from various points, and by various movements of the machine; as for instance, the feed can be controlled by the vertical movement of the knee, by the horizontal movement of the carriage, and by the cross feed movement of the table upon the carriage, and this is accomplished by the following instrumentalities:—30 represents a shaft journaled within the frame 7 one end projecting outwardly therefrom, and upon which the hand-lever 31 is secured. 32 represents an elongated rack-gear fixed to said shaft, the teeth of which are adapted to engage into the teeth 33 of the shifting lever 19. This shaft and gear constitute the clutch controller common to all of the feeds. 34 represents a shifting rod one end of which is slidably mounted within the frame 7, the opposite end being supported within a sleeve 35, formed integral with the knee 3. Said rod is provided at one end with rack-teeth adapted to intermesh with the rack-gear 32. The opposite end is provided with the beveled head 36. 37 represents a guide-plate fixed to the frame 1 of the machine provided with a groove within which the tripping dogs 38, 39, are adjustably mounted. These tripping dogs being preferably constructed as shown in the drawings, wherein one set of dogs are the duplicates of all employed in the various positions upon the various elements. Thus it will be seen that when the dogs 38, 39, are in the position shown in the Fig. 1 and say the knee is being fed upwardly carrying with it the tripping rod 34, such feed will be maintained until the head 36 strikes against the dog 38, moving the tripping rod 34 to the right actuating the rack gear 32 and shifting lever 19, thereby stopping or reversing the feed to the knee as the case may be. Again assume that the knee is being fed downward, and it is desired to automatically stop or reverse the feed, the knee will move in such downward direction until plunger head 36 comes in contact with the dog 39 when it will be thrown to the left returning plunger 34 to initial position, reversing the position of the clutch and consequently reversing the feed of the knee, this operation being automatic. To control or throw out this automatic feed by hand, the hand lever 31 is actuated thereby shifting the tripping rod 34 and shifting lever 19 to its desired position of forward or reverse feed or rest position. When the parts are thrown to their rest position the various feeds of the knee, saddle and table can be operated by hand.

The feed is controlled by the movement of the saddle as follows:—41 represents a trip rod slidably mounted within the casing 7 provided with rack teeth 43 (see Fig. 4) in mesh with the elongated rack-gear 32. Said tripping rod 41 is provided with a beveled head 42 adapted to be engaged by the dogs 44, 45, adjustably mounted and secured within the guide way 46 formed in the carriage 47. The function and operation are identical as dogs 38, 39, for operating the tripping rod mounted on the knee. An upward movement of the tripping rod 41 actuates elongated gear 32 in one direction for one shifting of the clutch, and a downward movement of the tripping rod 41 operates the aforesaid mechanism in the opposite direction. Thus as the saddle is fed backward or forward upon the knee, the dogs can be adjusted to control the drive at any point of saddle travel.

The feed is controlled by the movement of the table mounted on the saddle as follows:—48 represents a rod supported in the knee provided with rack-teeth at each end. The teeth at one end are intermeshed with the rack gear 32 and at the opposite end with an elongated gear 49 journaled within the saddle 47. Said saddle is grooved the entire length of the elongated gear to permit the forward and backward movement of the saddle upon the knee. This rack gear 49 is made elongated for the purpose of maintaining the teeth of the rod 48 in constant mesh while the saddle is being fed forward or back. 50 represents a trip rod slidably mounted within the casing 51 fixed to the front side of the carriage 47. Said rod 50 is provided with teeth adapted to mesh with the elongated rack gear 49 (see Fig. 2). The trip rod 50 is also provided with the beveled head 52 adapted to be engaged by the dogs 53, 54, adjustably secured within the groove 55 formed in the table 56. 57 represents a hand lever fixed upon the end of the elongated rack gear 49 for manually operating the shifting lever 19 at this point. It will be seen that an upward movement of the trip rod 50 will transmit motion to the elongated rack gear 49, rod 48, rack gear 42, operating the shifting lever 19 for shifting the clutch in one direction and a downward movement of the trip rod 50 reversing the action. It will also be seen from the drawings that the dogs 38, 45 and 53 are similar in construction imparting the same action to the shifting lever when actuating their respective tripping rods, the reverse movement being accomplished by the dogs 39, 44 and 54, which are similar in construction or the duplicates of each other. By this arrangement the operator cannot be confused as to the operation of any of the dogs. It will be further noted that the hand levers 31 and 57 serve as indicators to show the direction of travel of the knee carriage and table, as for instance, as shown in Fig. 1 the hand lever 31 is in its normal position with the clutch thrown out of engagement with either of the gears 11 or 15. Moving the lever to the left or in an arc upwardly when the knee feeding mechanism is in operation the knee will be fed upwardly. Moving the lever down the reverse feed will be thrown in moving the knee downward. The same lever serves to indicate the movement of the carriage 47 to the right or left. When the lever 31 with the saddle feed mechanism thrown in operation is moved to the left it indicates that the saddle is feeding in that direction. Moving it to the right or downward indicates that the saddle will feed to the right, the same being said of lever 57.

Having described our invention, we claim:—

1. In a device of the class described, a support, a reciprocating element thereon, feed mechanism therefor, a feed controlling clutch, a single trip on the support adapted to operate the clutch, and dogs on the reciprocating element, adapted to actuate the trip from either direction, whereby the clutch is operated whenever either dog is brought to the point on the support represented by the position of the trip.

2. In a machine of the class described, a reciprocating feeding device having adjustable dogs, a clutch, and a single controlling trip plunger having cam formations disposed in the same plane transverse to the line of travel of the feeding devices, whereby the trip may be automatically operated in either direction of feed movement, substantially as described.

3. In a device of the class described, a reciprocating feed element, a clutch controlled feed shaft, a clutch controller, a tripping plunger having motion transmission connection with the clutch controller, a head on said plunger, having a double cam formation disposed in the same plane transverse to the line of travel of the feed element, and dogs on the feed element adapted to respectively engage the said cam surfaces of the plunger head to automatically move the same in and out, thereby reversing the direction of feed, substantially as described.

4. In a machine of the class described, a reciprocating knee, saddle and table, a main clutch controlled feed shaft, a clutch controller, and trip mechanism for each of the three reciprocating elements, having motion transmission connection with the clutch controller, substantially as described.

5. In a machine of the class described, a reciprocating knee, saddle and table, a main clutch controlled feed shaft, a clutch controller, and dog and plunger trip mechanism for each of the three reciprocating elements, each trip having rack and pinion connection with the clutch controller, substantially as described.

6. In a machine of the class described, a reciprocating knee, saddle and table, a main clutch controlled feed shaft, a clutch controller, dog and plunger trip mechanism for each of the three reciprocating elements, each trip having rack and pinion connection with the clutch controller, the plunger and dog elements being formed to automatically reciprocate the plunger thereby reversing the direction of feed, substantially as described.

7. In a machine of the class described, a reciprocating knee, saddle and table, a main clutch controlled feed shaft, an elongated toothed clutch controller, a rack trip plunger and tripping dogs for each of the three reciprocating elements, and rack and pinion mechanisms between the plunger racks and the toothed controller whereby the knee, saddle or table may independently be caused to actuate the common clutch controller, substantially as described.

8. In a machine of the class described, a reciprocating knee, saddle and table, a main clutch controlled feed shaft, an elongated toothed clutch controller, a rack trip plunger and tripping dogs for each of the three reciprocating elements, and rack and pinion transmission mechanism between the plunger racks and the toothed controller whereby the knee, saddle or table may independently be caused to actuate the common clutch controller, and cam heads on the plunger, whereby each pair of dogs may automatically reciprocate the plunger, thereby rotating such controller in opposite directions to reverse the position of the clutch, substantially as described.

9. In a machine of the class described, a reciprocating feed element, a main clutch controlled feed shaft, and a clutch controller having rack teeth, a tripping plunger having rack teeth engaging the controller, a double cam head on the plunger disposed in the same transverse plane relative to the travel of the feed element and dogs on the feed element, adapted to respectively engage the plunger cams to automatically reciprocate the plunger and thereby causing the feed controller to rotate in opposite directions to reverse the position of the clutch, substantially as described.

10. In a machine of the class described, a reciprocating knee, saddle and table, a main clutch controlled feed shaft, an elongated clutch controller having rack teeth, a trip plunger for the knee having rack teeth engaging the clutch controller teeth, a tripping dog on the column, a similar trip plunger having rack teeth engaging the teeth of the clutch controller in juxtaposition to the saddle, and a coöperating trip dog on the saddle, a rack trip plunger in the saddle in juxtaposition to the table, and a coöperating trip dog on the table, and rack and pinion connections between the saddle plunger and the clutch controller, having a sliding connection, permitting of the saddle movement, whereby each of the three feed elements may be caused to independently actuate the common clutch controller in any operative position, substantially as described.

11. In a machine of the class described, a knee, a saddle sliding thereon, a table reciprocating on the saddle, a clutch controlled feed shaft outside of the saddle, an elongated pinion in the saddle, having rack and pinion transmission connection with the clutch permitting of the saddle movement, a trip on the saddle engaging the pinion, and a tripping dog on the table, substantially as described.

12. In a machine of the class described, two or more reciprocating feed elements, a main clutch controlled feed shaft, a rotatable clutch controller, a series of plungers each having a full controlling toothed connection with the rotatable controller, and means actuated by the feed elements, adapted to independently operate said plungers for controlling the motion of the main feed shaft, substantially as described.

In testimony whereof, we have hereunto set our hands.

ADOLPH L. DE LEEUW.
SOL EINSTEIN.

Witnesses:
OLIVER B. KAISER,
LEO O'DONNELL.